(12) United States Patent
Zhou et al.

(10) Patent No.: US 12,438,945 B2
(45) Date of Patent: Oct. 7, 2025

(54) METHOD AND APPARATUS FOR CROSS-COMPUTING POWER CLUSTER COMMUNICATION, ELECTRONIC DEVICE AND STORAGE MEDIUM

(71) Applicant: Beijing Baidu Netcom Science Technology Co., Ltd., Beijing (CN)

(72) Inventors: Mo Zhou, Beijing (CN); Zhaogeng Li, Beijing (CN); Dou Shen, Beijing (CN); Yanpeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/084,562

(22) Filed: Mar. 19, 2025

(65) Prior Publication Data
US 2025/0220079 A1  Jul. 3, 2025

(30) Foreign Application Priority Data

Dec. 11, 2024 (CN) .......................... 202411823274.0

(51) Int. Cl.
*H04L 67/1097* (2022.01)
*H04L 49/9005* (2022.01)

(52) U.S. Cl.
CPC ...... *H04L 67/1097* (2013.01); *H04L 49/9005* (2013.01)

(58) Field of Classification Search
CPC .................. H04L 67/1097; H04L 49/9005
See application file for complete search history.

(56) References Cited

U.S. PATENT DOCUMENTS

| | | | | |
|---|---|---|---|---|
| 10,509,764 | B1* | 12/2019 | Izenberg | ................. G06F 16/22 |
| 10,884,974 | B2* | 1/2021 | Izenberg | .......... G06F 16/90335 |
| 11,436,183 | B2* | 9/2022 | Izenberg | ............. H04L 67/1097 |
| 11,892,967 | B2* | 2/2024 | Izenberg | ................. G06F 16/22 |
| 2020/0151137 | A1* | 5/2020 | Izenberg | ................. G06F 16/22 |

(Continued)

FOREIGN PATENT DOCUMENTS

| | | | | |
|---|---|---|---|---|
| CN | 108075915 A | * | 5/2018 | ......... H04L 67/1004 |
| CN | 115776509 A | | 3/2023 | |
| CN | 118869777 A | * | 10/2024 | ........... H04L 47/628 |

*Primary Examiner* — Shean Tokuta
(74) *Attorney, Agent, or Firm* — Seed Intellectual Property Law Group LLP

(57) ABSTRACT

A method and apparatus for cross-computing power cluster communication, an electronic device, and a computer readable storage medium, are provided. An implementation of the method includes: in response to a communication initiator and a communication receiver respectively belonging to different computing power clusters, increasing a RDMA connection count on the basis of an initial connection count until a detected actual bandwidth value no longer increases, to obtain a target connection count; increasing, with the RDMA connection count being maintained at the target connection count, a Buffer size on the basis of an initial size until a detected actual bandwidth value no longer increases, to obtain a target size; determining cross-cluster transmission parameters, based on the target connection count and the target size; and communicating, cross-cluster transmission parameters, with the communication receiver belonging to a different computing power cluster.

20 Claims, 6 Drawing Sheets

(56) References Cited

U.S. PATENT DOCUMENTS

| | | | |
|---|---|---|---|
| 2021/0124710 A1* | 4/2021 | Izenberg | H04L 69/22 |
| 2023/0004521 A1* | 1/2023 | Izenberg | H04L 69/22 |
| 2024/0126714 A1* | 4/2024 | Izenberg | G06F 16/90335 |
| 2025/0119384 A1* | 4/2025 | Farrokhbakht | H04L 49/109 |

* cited by examiner

METHOD AND APPARATUS FOR CROSS-COMPUTING POWER CLUSTER COMMUNICATION, ELECTRONIC DEVICE AND STORAGE MEDIUM

CROSS-REFERENCE TO RELATED APPLICATIONS

This application claims the priority from Chinese Patent Application No. 202411823274.0, filed in the National Intellectual Property Administration (CNIPA) on Dec. 11, 2024, the contents of which are hereby incorporated by reference in their entirety.

TECHNICAL FIELD

The present disclosure relates to the technical field of communication, in particular to the technical fields such as graphics processors, computing power clusters, model training, and generative large language models, and more particularly to a method and apparatus for cross-computing power cluster communication, an electronic device, a computer readable storage medium, and a computer program product.

BACKGROUND

With the gradual expansion of training computation in the era of large models, an increasing number of chips and increasingly larger computing power clusters are required. Building a single computing power cluster with a scale of hundreds of thousands of cards, while enabling an extreme computational efficiency, imposes extremely high requirements on the infrastructure and the cluster with a scale of hundreds of thousands of cards may not be able to be accommodated in a single machine room.

At the same time, in training scenarios requiring tens of thousands of cards, utilizing multiple clusters with a scale of thousands of cards not only can reduce the construction costs of clusters with tens of thousands of cards, but also can efficiently utilize fragmented clusters with a scale of thousands of cards and activate the supply of computing power, which are all urgent issues that need to be addressed by those skilled in the art.

SUMMARY

Embodiments of the present disclosure propose a method and apparatus for cross-computing power cluster communication, an electronic device, a computer readable storage medium, and a computer program product.

In a first aspect, an embodiment of the present disclosure proposes a method for cross-computing power cluster communication, applied to a communication initiator, including: in response to the communication initiator and a communication receiver respectively belonging to different computing power clusters, increasing a remote direct memory access (RDMA) connection count on the basis of an initial connection count until a detected actual bandwidth value no longer increases, to obtain a target connection count; increasing, with the RDMA connection count being maintained at the target connection count, a Buffer size on the basis of an initial size until a detected actual bandwidth value no longer increases, to obtain a target size; determining cross-cluster transmission parameters, based on the RDMA connection count set as the target connection count and the Buffer size set as the target size; and communicating, according to the cross-cluster transmission parameters, with the communication receiver belonging to a different computing power cluster.

In a second aspect, an embodiment of the present disclosure proposes an apparatus for cross-computing power cluster communication, applied to a communication initiator, including: a connection count scaling unit, configured to, in response to the communication initiator and a communication receiver respectively belonging to different computing power clusters, increase a remote direct memory access (RDMA) connection count on the basis of an initial connection count until a detected actual bandwidth value no longer increases, to obtain a target connection count; a Buffer scaling unit, configured to increase, with the RDMA connection count being maintained at the target connection count, a Buffer size on the basis of an initial size until a detected actual bandwidth value no longer increases, to obtain a target size; a cross-cluster transmission parameter determination unit, configured to determine cross-cluster transmission parameters, based on the RDMA connection count set as the target connection count and the Buffer size set as the target size; and a first cross-cluster communication unit, configured to communicate, according to the cross-cluster transmission parameters, with the communication receiver belonging to a different computing power cluster.

In a third aspect, an embodiment of the present disclosure proposes an electronic device, including: at least one processor; and a memory communicatively connected to the at least one processor; where the memory stores instructions executable by the at least one processor, and the instructions, when executed by the at least one processor, cause the at least one processor to perform the method for cross-computing power cluster communication according to the first aspect.

In a fourth aspect, an embodiment of the present disclosure proposes a non-transitory computer readable storage medium storing computer instructions, wherein, the computer instructions are used to cause the computer to perform the method for cross-computing power cluster communication according to the first aspect.

In a fifth aspect, an embodiment of the present disclosure proposes a computer program product, comprising a computer program, the computer program, when executed by a processor, implements steps of the method for cross-computing power cluster communication according to the first aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

By reading and referring to detailed description on the non-limiting embodiments in the following accompanying drawings, other features, objectives and advantages of the disclosure will become more apparent.

FIG. 7-1 is a structural schematic diagram of cross-data center transmission provided according to an embodiment of the present disclosure;

FIG. 7-2 is a flowchart of a method for cross-computing power cluster communication in conjunction with an application scenario provided according to an embodiment of the present disclosure;

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description. It should be noted that the embodiments in the present disclosure and the features in the embodiments may be combined with each other on a non-conflict basis.

In the technical solution of the present disclosure, the processing of user personal information involved, including collection, storage, use, processing, transmission, provision and disclosure, etc. are all in compliance with relevant laws and regulations, and do not violate public order and good customs.

Figure 1:
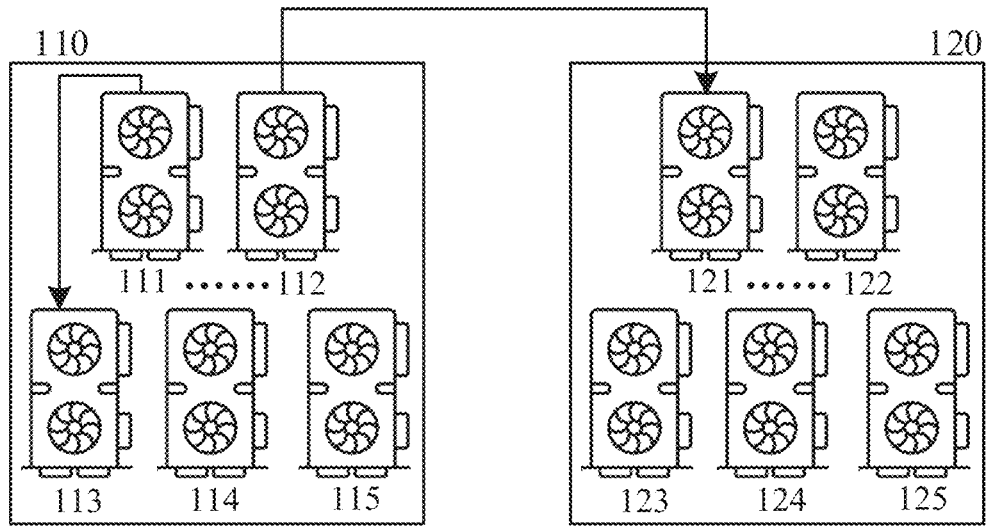
FIG. 1 is an exemplary system architecture in which embodiments of the present disclosure may be implemented.

FIG. 1 illustrates an exemplary system architecture 100 to which embodiments of a method and apparatus for cross-computing power cluster communication, an electronic device and a computer readable storage medium of the present disclosure may be applied.

As shown in FIG. 1, the system architecture 100 may include a first computing power cluster 110 and a second computing power cluster 120, where the first computing power cluster 110 includes a plurality of graphics processors, such as 111, 112, 113, 114, and 115 existing in the form of graphics cards (the number is not limited to five, only a few are shown in FIG. 1 as an example), and the second computing power cluster 120 also includes a plurality of graphics processors, such as 121, 122, 123, 124, and 125 also in the form of graphics cards.

In different computing power clusters, any device initiating communication may be regarded as a communication initiator. It may be that only one of the graphic processors constituting a computing power cluster is regarded independently as the communication initiator, or when all graphic processors in the entire computing power cluster initiate communication and transmit data to graphic processors in another computing power cluster, the entire computing power cluster initiating the communication may be collectively regarded as the communication initiator.

The graphic processor constituting the computing power cluster may, independently or via a communication component, in conjunction with a pre-installed communication control application, realize communication with other graphic processor(s) within the same computing power cluster or with other graphic processor(s) within other computing power cluster(s). It should be noted that there may be many reasons and purposes for initiating communication, which is not limited herein, and the corresponding solution is given only for the communication method and the determination of transmission parameters.

The graphics processor is usually represented as hardware. Of course, in specific scenarios (e.g., simulation scenarios), it may also be represented as software or a software runtime product, which is not limited herein.

The communication initiator may communicate with a communication receiver through the built-in communication control application. Taking the graphics card 112 as the communication initiator and the graphics card 121 as the communication receiver in FIG. 1 as an example, the graphics card 112 may realize cross-cluster communication in the following form when running the communication control application: first, increasing a remote direct memory access (RDMA) connection count on the basis of an initial connection count until a detected actual bandwidth value no longer increases, to obtain a target connection count; then increasing, with the RDMA connection count being maintained at the target connection count, a Buffer size on the basis of an initial size until a detected actual bandwidth value no longer increases, to obtain a target size; next, determining cross-cluster transmission parameters, based on the RDMA connection count set as the target connection count and the Buffer size set as the target size; and finally, communicating with the graphics card 121 as the communication receiver according to the cross-cluster transmission parameters.

In addition to the cross-cluster communication presented in the above example, FIG. 1 also illustrates that the graphics card 111, which is the communication initiator, may communicate within the cluster with the graphics card 113, which is the communication receiver, and this communication process may likewise be realized under the control of the communication control application.

Further, when the communication receiver cannot clearly determine whether it belongs to a different computing power cluster than the communication initiator, multiple methods may be used for confirmation, such as by using communication latency, or packet loss rate, to confirm whether the transmission environment is intra-cluster or cross-cluster.

It should be understood that the number of the graphics cards, the graphics processors and the computing power clusters in FIG. 1 is merely illustrative. Depending on implementation needs, there may be any number of the graphics cards, the graphics processors and the computing power clusters.

Figure 2:
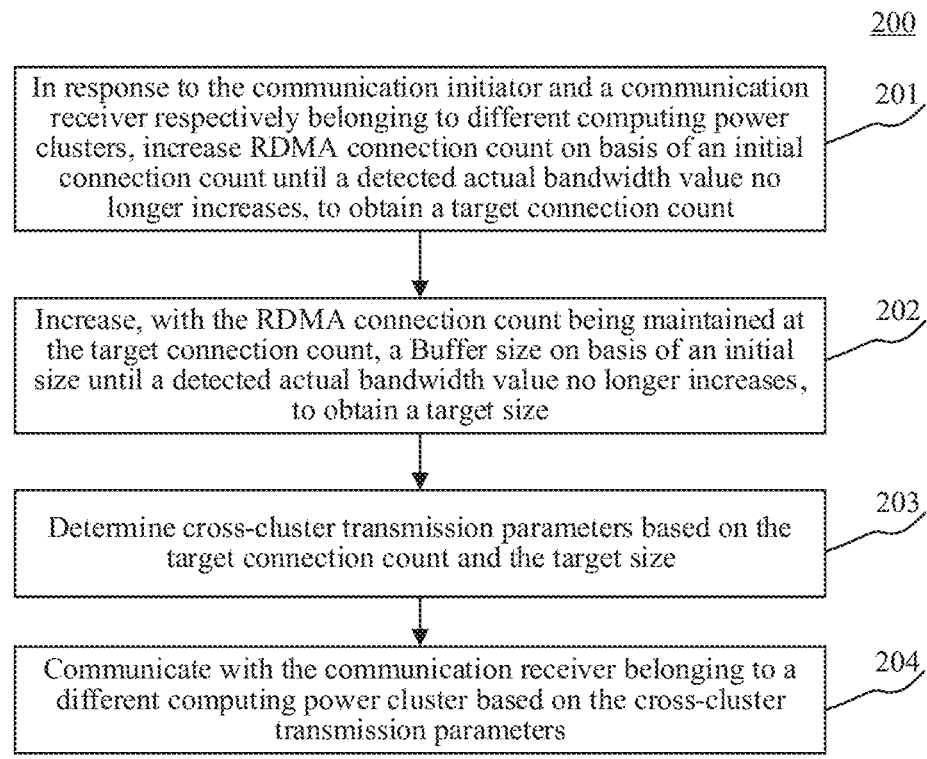
FIG. 2 is a flowchart of a method for cross-computing power cluster communication provided according to an embodiment of the present disclosure.

Referring to FIG. 2, FIG. 2 is a flowchart of a method for cross-computing power cluster communication provided according to an embodiment of the present disclosure, where a flow 200 includes the following steps.

Step 201: in response to the communication initiator and a communication receiver respectively belonging to different computing power clusters, increasing a remote direct memory access (RDMA) connection count on the basis of an initial connection count until a detected actual bandwidth value no longer increases, to obtain a target connection count.

This step aims to be performed by an executing body of the method for cross-computing power cluster communication (e.g., the graphics card 112 as the communication initiator shown in FIG. 1, belonging to the first computing power cluster). When communicating with the communication receiver belonging to a different computing power cluster (e.g., the graphics card 121 as the communication receiver shown in FIG. 1, belonging to the second computing power cluster), the executing body may increase the remote direct memory access (RDMA) connection count on the basis of the initial connection count until the detected actual bandwidth value no longer increases, to obtain the target connection count.

The different computing power clusters described in an embodiment of the present disclosure mainly refer to computing power clusters for training generative large language model(s), composed of graphical processors located in different machine rooms at different locations, respectively. If different machine rooms are directly classified as different computing power clusters, different computing power clusters may be simply understood as different machine rooms, i.e., the cross-cluster communication may also be adaptively understood as cross-machine room communication. As for how the communication initiator can clearly determine whether it belongs to a different computing power cluster than the communication receiver, multiple methods may be used for confirmation, such as by using communication latency, or packet loss rate, to confirm whether the transmission environment is intra-cluster or cross-cluster. It should be noted that compared to intra-cluster communication, cross-cluster communication typically has significantly higher latency, and when the same RDMA technology is used for communication, cross-cluster communication is more susceptible to fluctuations in the network environment, leading to higher packet loss rate. Therefore, these characteristics may be used to determine whether the communication initiator and the communication receiver belong to different computing power clusters, i.e., whether the communication performed is intra-cluster or cross-cluster communication.

Here, RDMA (Remote Direct Memory Access) technology is a data acquisition technology that allows computers to directly access each other's memory without the intervention of operating system kernels. Embodiments of the present disclosure enable low-latency and high-throughput cross-cluster communication by using the RDMA technology. The RDMA connection count refers to the number of RDMA connections, that can be established between the communication initiator and the communication receiver when using RDMA for communication, that is, the number of communication channels established between the two ends of the communication. Each connection usually represents a session, within which data may be directly accessed from a memory of one end to a memory of the other end. The RDMA connection count is usually influenced by hardware limitations, network topology, and specific system configuration parameters, and the RDMA connection count also has the following relationships with performance.

Concurrency: increasing the RDMA connection count may enhance system concurrency, enabling multiple data transmission tasks to be executed simultaneously. However, an excessive connection count may lead to resource contention (e.g., bandwidth, memory, or processor), thereby affecting overall system performance;

Latency: each connection typically incurs fixed time for connection establishment and teardown. Excessive connections may result in higher system overhead and longer connection initialization time;

Throughput: proper management of the connection count may improve the throughput of data transmission. For example, using multiple connections may allow parallel transmission of larger volumes of data, reducing the bottleneck caused by a single connection.

Therefore, when the communication initiator communicates with the communication receiver using the RDMA technology, increasing the RDMA connection count may be used to improve the throughput of single data transmission. However, the specific method and ratio of increasing must take into account not only various impact factors but also the overall impact on performance.

In this step, after each time the connection count is increased, a current bandwidth value is re-detected, to determine, from the bandwidth value obtained from each detection, whether the detected bandwidth value increases with the increasing of the connection count. If the detected bandwidth value increases therewith, it indicates that the increasing of the connection count does improve the throughput of single data transmission, i.e., the increasing of the connection count is effective, and there is still room for further increasing the connection count. Once the bandwidth values detected before and after the increasing of the connection count do not increase accordingly, it may be considered that there is no more room for further increasing the connection count. That is, it is no longer possible to further improve the data transmission throughput by adjusting the connection count. In this case, a connection count before the last increasing of the connection count may be determined as the target connection count. For example, assuming that each time 2 connections are added on the basis of the initial connection count, and compared to the bandwidth value before the increasing of the connections, increased bandwidth values may be consistently detected until increasing the connection count up to 20. However, when increasing the connection count from 20 to 22, it is found that the re-detected bandwidth value after the increasing of the connection count is the same as the bandwidth value before the increasing of the connection count (i.e., the bandwidth value does not increase). In this case, it should be assumed that the present increasing of the connection count is invalid, and that the connection count (i.e., 20) after the preceding increasing should be used as the target connection count. Of course, if each preceding increasing of the connection count by 2 is able to increase the bandwidth value obtained by re-detection by the same ratio or more, compared to the bandwidth value obtained by detection before the corresponding increasing of the connection count, it can be seen that the actual connection count may be increased by a greater ratio. Similarly, increasing the connection count to 22, if it is found that the bandwidth value, re-detected after the increasing of the connection count is performed, is larger than the bandwidth value detected before the increasing, but the increase ratio thereof is lower than the increase ratio of the connection count, it can be seen that the connection count may still be increased from 20, but it is no longer need to increase the connection count in step size of "2". In this regard, in order to determine a more accurate target connection count, a smaller step size may be adopted for continuing to increase the connection count on the basis of 20, until the bandwidth values obtained from detections before and after the last increasing of the connection count are identical, the connection count before the last increasing thereof is determined as the target connection count.

A method for detecting a bandwidth value, including but not limited to, may include the following steps: acquiring an actual data transmission size at a moment corresponding to the calculated actual latency; and determining the detected bandwidth value, based on the actual data transmission size and the actual latency.

That is, this implementation combines the actual latency and the actual data transmission size at the corresponding moment of the communication between the communication initiator and the communication receiver, to calculate the bandwidth value that represents the size of data that can be transmitted per second, in the case where it is clear that the actual data transmission size can be transmitted at the actual latency. Here, the actual data transmission size may be determined based on an actual Buffer size at the actual moment, and if the Buffer size has not been adjusted, the actual data transmission size may be determined based on a default Buffer size.

Step 202: increasing, with the RDMA connection count being maintained at the target connection count, a Buffer size on the basis of an initial size until a detected actual bandwidth value no longer increases, to obtain a target size.

On the basis of step 201, this step aims to perform size increasing by the executing body (with the RDMA connection count being maintained at the target connection count), on the Buffer size on the basis of the initial size until the detected actual bandwidth value no longer increases, to obtain the target size.

In the field of data transmission, a Buffer is a small memory area used for storing and buffering data. During data transmission, when data reaches a target end (e.g., display, receiver, application) from a source end (e.g., hard disk, network, sensor), there is often a discrepancy between the transmission rate and the processing rate. In this regard, a Buffer serves as a bridge, temporarily storing data in the buffer to ensure smooth data flow between the source end and the target end. The primary role of the Buffer is to help improve the performance and efficiency of the system, especially when dealing with unstable data flow rates or communication between devices having different rates.

That is, this step aims to further attempt to improve the data transmission throughput by adjusting the Buffer size in the case where it is no longer possible to improve the data transmission throughput by adjusting the connection count, i.e., it is expected that the bandwidth value obtained by detection can be further improved by adjusting the Buffer size.

Similar to step 201, in this step, after each time the Buffer size is increased, a current bandwidth value is re-detected, to determine, from the bandwidth value obtained from each detection, whether the detected bandwidth value increases with the increasing of the Buffer size. If the detected bandwidth value increases therewith, it indicates that the increasing of the Buffer size does improve the throughput of single data transmission, i.e., the increasing of the Buffer size is effective, and there is still room for further increasing the Buffer size. Once the bandwidth values detected before and after the increasing of the Buffer size do not increase accordingly, it may be considered that there is no more room for further increasing the Buffer size. That is, it is no longer needed to further improve the data transmission throughput by adjusting the Buffer size. In this case, a Buffer size before the last increasing of the Buffer size may be determined as the target size. For example, assuming that each time the Buffer size is increased by 2 MB on the basis of the initial size, and compared to the bandwidth value before each increasing of the Buffer size, increased bandwidth values may be consistently detected until increasing the Buffer size up to 8 MB. However, when increasing the Buffer size from 8 MB to 10 MB, it is found that the re-detected bandwidth value after the increasing of the Buffer size is the same as the bandwidth value before the increasing of the Buffer size (i.e., the bandwidth value does not increase). In this case, it should be assumed that the present increasing of the Buffer size is invalid, and that the Buffer size (i.e., 8 MB) after the preceding increasing should be used as the target size. Of course, if each previous increasing of the Buffer size by 2 MB is able to increase the bandwidth value obtained by re-detection by the same ratio or more, compared to the bandwidth value obtained by detection before the corresponding increasing of the Buffer size, it can be seen that the actual Buffer size may be increased by a greater ratio. Similarly, increasing the Buffer size to 10 MB, if it is found that the bandwidth value, re-detected after the increasing of the Buffer size, is larger than the bandwidth value before the increasing, but the increase ratio thereof is lower than the increase ratio of the Buffer size, it can be seen that the Buffer size may still be increased from 8 MB, but it is no longer need to increase the Buffer size in step size of "2 MB". In this regard, in order to determine a more accurate target size, a smaller scaling step size may be adopted for continuing to increase the Buffer size on the basis of 8 MB, until the bandwidth values obtained from detections before and after the last increasing of the Buffer size are identical, the Buffer size before the last increasing thereof is determined as the target size.

Step 203: determining cross-cluster transmission parameters, based on the RDMA connection count set as the target connection count and the Buffer size set as the target size.

On the basis of step 202, this step aims to determine, by the above executing body, the cross-cluster transmission parameters, based on the RDMA connection count set as the target connection count and the Buffer size set as the target size. That is, the RDMA connection count set as the target connection count and the Buffer size set as the target size serve as main components constituting the cross-cluster transmission parameters, but they are not necessarily all the components. Other parameters that can also affect data transmission may also be included in the cross-cluster transmission parameters, which is not limited herein.

Step 204: communicating, according to the cross-cluster transmission parameters, with the communication receiver belonging to a different computing power cluster.

On the basis of step 203, this step aims to communicate with the communication receiver belonging to a different computing power cluster according to the cross-cluster transmission parameters by the above executing body.

An embodiment of the present disclosure provides a method for cross-computing power cluster communication, applied to a communication initiator, for a situation in which a communication initiator and a communication receiver respectively belong to different computing power clusters, a method for re-determining cross-cluster transmission parameters matching the cross-cluster communication environment is provided, i.e., for the cross-cluster communication having a significantly increased latency compared to intra-cluster communication, a method for successively increasing a remote direct memory access (RDMA) connection count and a Buffer size is provided for the cross-cluster communication, to determine a target connection count and a target size that match the actual bandwidth value, then communicate with the communication receiver belonging to a different computing power cluster according to the cross-cluster transmission parameters determined based on the target connection count and the target size, so that the cross-cluster communication and the intra-cluster communication use transmission parameters matching their respective actual communication environments, thus improving an overall communication efficiency and a data transmission volume, thereby improving the training efficiency of generative large language models and reducing the time required for training.

Figure 3:
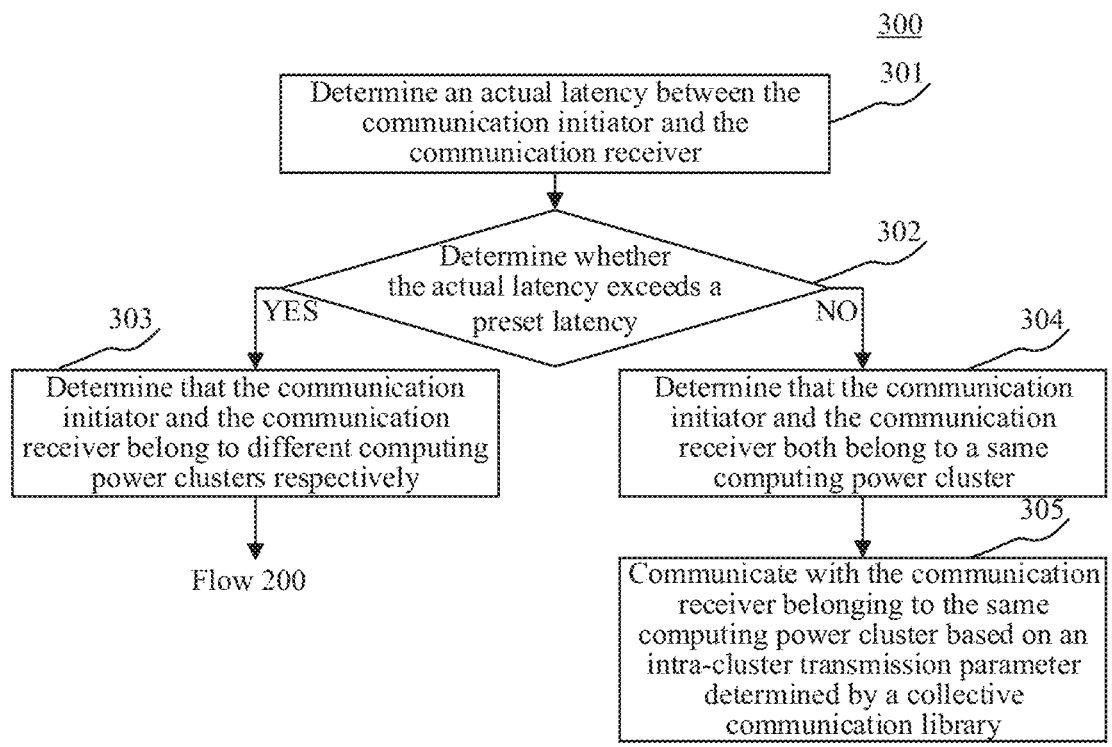
FIG. 3 is a flowchart of a determination method for determining whether a communication initiator and a communication receiver respectively belong to different computing power clusters based on an actual latency provided according to an embodiment of the present disclosure.

To deepen the understanding of how to determine whether the communication initiator and the communication receiver belong to different computing power clusters, referring to FIG. 3. FIG. 3 is a flowchart of a determination method for determining whether a communication initiator and a communication receiver respectively belong to different computing power clusters based on an actual latency provided according to an embodiment of the present disclosure, where a flow 300 includes the following steps.

Step 301: determining an actual latency with the communication receiver.

This step aims to determine the actual latency between the communication initiator and the communication receiver by the above executing body. An implementation, including but not limited to, may be as follows.

First, determining a moment when the communication initiator sends out data to the communication receiver as a start moment; then, determining a moment when an acknowledgement notice, which is returned by the communication receiver after receiving the data, is received as an end moment; and finally, calculating to obtain the actual latency, based on the start moment and the end moment.

Further, in order to ensure the accuracy of the calculated actual latency, a preset number of start-end time pairs composed of start moments and corresponding end moments may also be selected, that is, latency values corresponding to the start-end time pairs are calculated to obtain a latency set, and then the actual latency served by an average latency is obtained by calculating an average of the latency values in the latency set, so as to eliminate accidental or fluctuating errors using the averaging method.

Step 302: determining whether the actual latency exceeds a preset latency, if yes, performing step 303, otherwise performing step 304.

This step aims to enable the above executing body to compare the actual latency with the preset latency, and to execute different subsequent processing branches based on the two comparison results. In the present embodiment, the preset latency serves as a latency boundary value between higher latency and lower latency. Here, the higher latency corresponds to cross-cluster communication latency, while the lower latency corresponds to intra-cluster communication latency.

Step 303: determining that the communication initiator and the communication receiver respectively belong to the different computing power clusters.

This step is established on the basis that the determination result in step 302 is that the actual latency exceeds the preset latency, and aims to determine by the above executing body that the communication initiator and the communication receiver respectively belong to the different computing power clusters.

Since this situation corresponds to an execution trigger condition of step 201, subsequent operations will be performed in accordance with the solution provided by flow 200.

Step 304: determining that the communication initiator and the communication receiver both belong to a same computing power cluster.

This step is established on the basis that the determination result in step 302 is that the actual latency does not exceed the preset latency, and aims to determine by the above executing body that the communication initiator and the communication receiver both belong to the same computing power cluster.

In contrast to different computing power clusters mainly referring to computing power clusters for training generative large language model(s) composed of graphical processors located in different machine rooms at different locations, respectively, the same computing power cluster may refer to a computing power cluster for training generative large language model(s) composed of graphical processors located in the same machine room at the same location. Similarly, if different computing power clusters may be simplified as different machine rooms, the computing power cluster may also be simplified as the same one machine room.

Step 305: communicating with the communication receiver belonging to the same computing power cluster according to an intra-cluster transmission parameter determined by a collective communication library.

On the basis of step 304, this step aims to communicate with the communication receiver belonging to the same computing power cluster by the above executing body, based on the intra-cluster transmission parameter determined by the collective communication library.

NVIDIA Collective Communications Library (NCCL), is an efficient communication library developed by NVIDIA, is primarily designed to accelerate collective communication operations in deep learning frameworks. It is widely applied in distributed training scenarios, particularly in multi-GPU or multi-node environments. NCCL focuses on delivering high-performance communication protocols and algorithms, and aims to leveraging GPU hardware acceleration to significantly improve data transmission speed and parallel computing efficiency.

NCCL provides a variety of common collective communication operations for distributed training, which are typically used to synchronize and share data across multiple computing nodes. Common collective communication operations in deep learning training include the following.

1) AllReduce: exchanges data across multiple nodes and aggregates the data (e.g., summation, averaging). In deep learning, it is commonly used for gradient synchronization in distributed training.
2) Broadcast: transmits data from one node to all other nodes. It is typically used to synchronize model parameters or other shared data to individual nodes.
3) AllGather: collects and aggregates data from multiple nodes to all nodes. It is used for input aggregation in distributed training of data.
4) Reduce: exchanges data across multiple nodes and aggregates the data, usually aggregates data from multiple nodes to a single node.
5) ReduceScatter: aggregates data from multiple nodes and distributes data to individual nodes. Complementary with AllGather.

The following advantages may be realized by using NCCL.

1) Hardware acceleration: NCCL fully leverages NVIDIA's hardware characteristics such as NVLink (for high-bandwidth GPU-to-GPU communication), or NVIDIA RDMA, to provide extremely high bandwidth and low-latency communication.
2) Multi-GPU support: specifically designed for GPUs, NCCL supports single-node, multi-GPU configurations and cross-node distributed training, can effectively improve training efficiency.
3) Efficient algorithms: NCCL implements a variety of optimized communication algorithms tailored to different network topologies and hardware characteristics, to minimize communication bottlenecks.
4) Ease of use and compatibility: NCCL provides easy-to-integrate API interfaces that work seamlessly with popular deep learning frameworks. Its straightforward API design allows users to focus on application-layer logic without worrying about underlying communication implementations.
5) Cross-platform support: NCCL supports a variety of Linux systems, as well as GPU hardware in CUDA environments, adapting to diverse multi-GPU configurations.

In addition, NCCL is adopted as the default communication library by multiple deep learning frameworks (e.g., TensorFlow, PyTorch, MXNet) to accelerate communication between multi-GPUs or to accelerate communication during distributed training. In particular, these frameworks invoke NCCL to handle tasks such as gradient synchronization and model parameter broadcasting. In this way, the frameworks enable efficient distributed training, particularly in scenarios involving using multiple GPUs. For example, torch.distributed module in PyTorch provides integration with NCCL, which may be configured to specify a communication backend as NCCL for performing efficient communication operations in multi-GPU environments.

That is, this step makes full use of the existing NCCL technology, which may provide an appropriate intra-cluster transmission parameter for communication within the computing power cluster. However, the existing NCCL technology cannot identify whether the communication is intra-cluster communication or cross-cluster communication, and only provides a set of transmission parameter determination solutions that are more suitable for intra-cluster communication. Therefore, when it is clear that the current communication belongs to intra-cluster communication, this step directly uses the NCCL technology to provide an intra-cluster transmission parameter to realize intra-cluster communication.

In the present embodiment, through steps 301-305, a method is provided to determine whether it is intra-cluster communication or cross-cluster communication based on the actual latency between the two communication ends, and a corresponding method for determining a matching transmission parameter is provided for each of these two different types of communication. Then, different types of communication are performed by using different transmission parameters, so as to finally improve the overall communication efficiency and data throughput.

Of course, other discrimination means for determining whether the communication is intra-cluster communication or cross-cluster communication may also be combined with the above embodiment to form new embodiments, which will not be enumerated herein.

Figure 4:
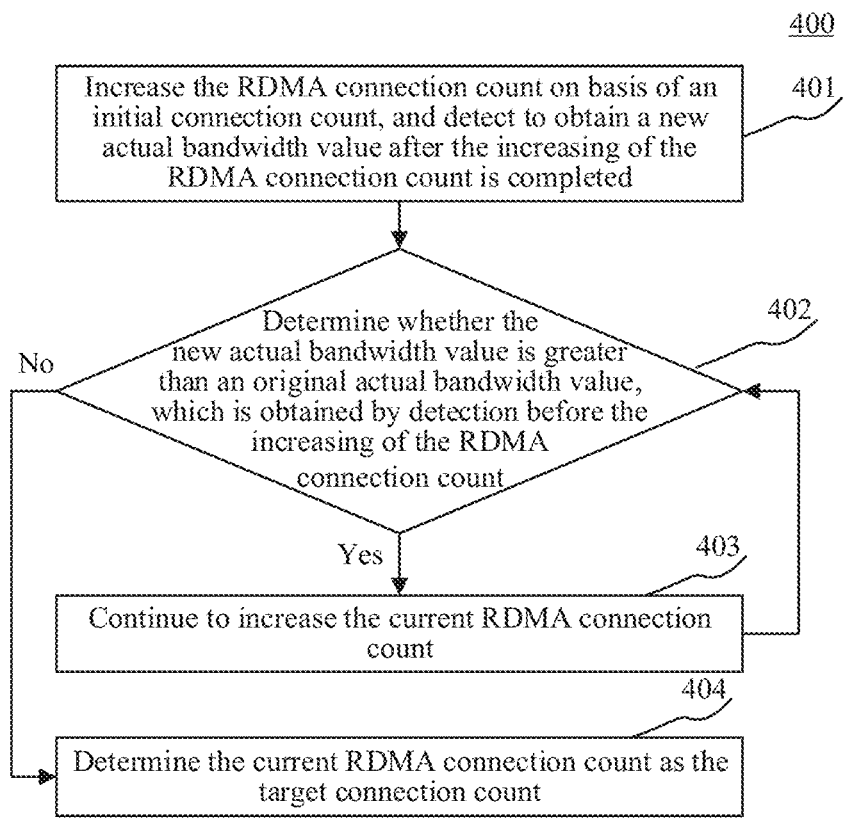
FIG. 4 is a flowchart of a method for increasing a RDMA connection count to determine a target connection count provided according to an embodiment of the present disclosure.

To deepen the understanding of how to finally determine the target connection count by increasing the RDMA connection count, referring to FIG. 4, FIG. 4 is a flowchart of a method for increasing a RDMA connection count to determine a target connection count provided according to an embodiment of the present disclosure, where a flow 400 includes the following steps.

Step 401: increasing the RDMA connection count on the basis of the initial connection count, and detecting to obtain a new actual bandwidth value after the increasing of RDMA connection count is performed.

This step aims to increase, by the executing body, the RDMA connection count on the basis of the initial connection count, and to detect to obtain the new actual bandwidth value after the increasing of the RDMA connection count is performed. Since the initial connection count is an initial value of the RDMA connection count, the increasing of the connection count described in this step may be understood as a first-time increasing of the connection count. Assuming that the initial connection count is 2, and assuming that the increasing is performed according to a fixed scaling step size, and this scaling step size is 3, then a new connection count obtained after the first-time increasing is 5.

In addition, after the first-time increasing of the connection count is completed, it may re-detect to obtain the actual bandwidth value of a current communication link (hereinafter referred to as the new actual bandwidth value to distinguish it from an original actual bandwidth value obtained by detection before the increasing of the connection count in the current round).

Step 402: determining whether the new actual bandwidth value is greater than an original actual bandwidth value obtained by detection before the increasing of the connection count is performed, if yes, performing step 403, otherwise, performing step 404.

On the basis of step 401, this step aims to determine, by the above executing body, whether the new actual bandwidth value is greater than the original actual bandwidth value detected before the increasing of the connection count is performed, and to execute different processing branches based on the two determination results, respectively.

Step 403: continue to increase the current connection count of the RDMA connections.

This step is established on the basis that the determination result in step 402 is that the new actual bandwidth value is greater than the original actual bandwidth value, indicating that the processing method of increasing the connection count at this round is effective, and that there is still room for further increasing the connection count.

To confirm whether the increasing of the connection count in a new round has achieved the desired effect and is effective, the method skips back to step 402 to reevaluate whether the bandwidth values detected after the increasing in this new round also show an increase. If the same increase continues, step 403 will be repeatedly executed until no further increase occurs, and then it may be assumed that there is no more room for further increasing the connection count.

Step 404: determining the current connection count of the RDMA connection count as the target connection count.

This step is established on the basis that the determination result in step 402 is that the new actual bandwidth value is not greater than the original actual bandwidth value, i.e., it should be manifested that the new actual bandwidth value is equal to the original actual bandwidth value. Then, it may be assumed that the last increasing of the connection count is ineffective. Therefore, it may determine the connection count after the last effective increasing as the target connection count.

Here, the increasing of the connection count includes following.

The RDMA connection count may be increased by a uniform scaling strategy by a fixed step size (such as the increasing by a scaling step size of 3 mentioned in the above example) or by a non-uniform scaling strategy by a variable step size. Compared to the uniform scaling strategy, the non-uniform scaling strategy aims at reducing iterations of the increasing of the connection count by using a larger step size when the connection count should be increased quickly, and accurately approximating the target connection count by using a smaller step size when the connection count should be scaled slowly.

An implementation, including but not limited to, may be as follows.

When the connection count is increased by the non-uniform scaling strategy by a variable step size, increasing the RDMA connection count on the basis of the initial connection count using exponential increase followed by linear increase until the detected actual bandwidth value no longer increases, to obtain the target connection count; where a switching point from the exponential increase to the linear increase occurs when an increase ratio of the new actual bandwidth value detected after the exponential increase, compared to the original actual bandwidth value detected before the corresponding exponential increase, is lower than an increase ratio of the connection count.

The reason for initially using exponential increase is that the initial connection count is usually small and far from a connection count upper limit. By using exponential increase, the method rapidly approximates the connection count upper limit. It should be understood that if the increase ratio of the bandwidth value detected before and after each exponential increase of the connection count is not less than the increase ratio of the connection count itself, it indicates that the current increasing of the connection count has actually not yet reached the bandwidth value's upper limit. Therefore, exponential increase may continue, and even an increase rate of the exponential increase may be further turned up. However, if it is found that the increase ratio of the bandwidth value detected before and after a certain exponential increase of the connection count is less than the increase ratio of the connection count, it indicates that the bandwidth value's upper limit has been preliminarily reached in the current round of adjusting the connection count. That is, the increase ratio of the connection count at this round has exceeded the increase ratio of the bandwidth value. Therefore, the connection count after this round of increasing is inaccurate and mismatched with the currently detected actual bandwidth value. Therefore, it may switch to linear increase to explore upward the most accurate target connection count with a smaller ratio, based on the connection count after the last effective exponential increase. That is, the target connection count should be the connection count after the last effective linear increase.

Further, an increase step size of linear increase doesn't have to be fixed and may also start large and then become small. That is, an increase ratio of the first linear increase may be determined based on actual bandwidth increase ratio(s) before and/or after a last exponential increase. An increase ratio of non-first linear increase may be determined based on actual bandwidth increase ratio(s) obtained before and/or after a preceding linear increase.

Furthermore, the RDMA connection count upper limit may be determined based on a bandwidth upper limit of a NIC hardware. After determining the upper limit of the connection count, the above executing body may also control an increased connection count after the last exponential increase to be less than the upper limit of the connection count, to prevent the last exponential increase from increasing the connection count to a value beyond the upper limit of the connection count.

Figure 5:
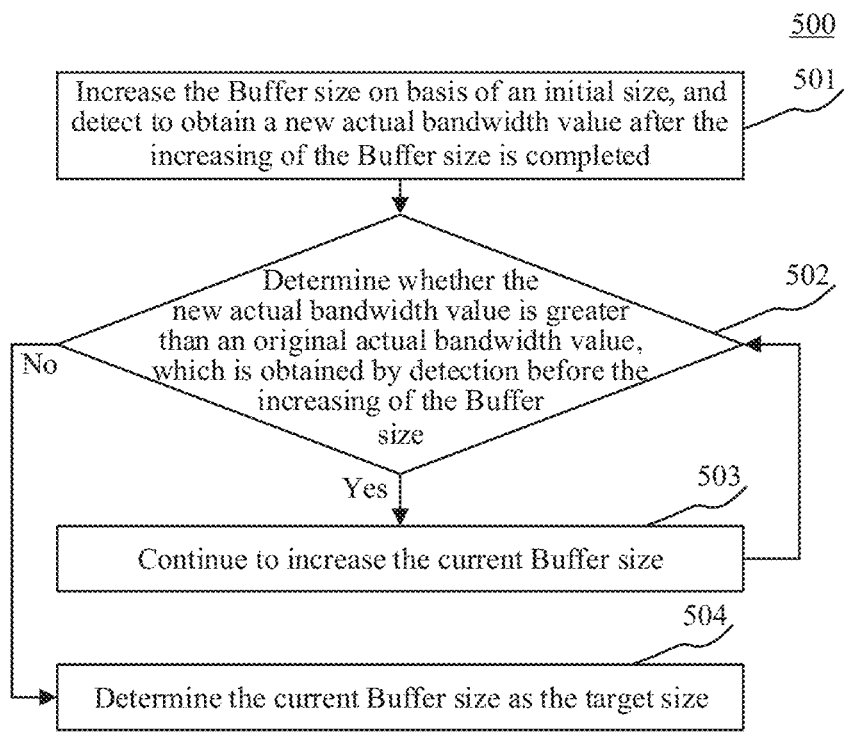
FIG. 5 is a flowchart of a method for increasing a Buffer size to determine a target size provided according to an embodiment of the present disclosure.

Similar to the solution for increasing a connection count provided in FIG. 4, further referring to FIG. 5, FIG. 5 is a flowchart of a method for increasing a Buffer size to determine a target size provided according to an embodiment of the present disclosure, where a flow 500 includes the following steps.

Step 501: increasing the Buffer size on the basis of the initial size, and detecting to obtain a new actual bandwidth value after the increasing of the Buffer size is performed.

This step aims to increase the Buffer size on the basis of the initial size, and to detect to obtain the new actual bandwidth value after the increasing of the Buffer size is performed by the executing body. Since the initial size is an initial value of the Buffer size, the increasing of the Buffer size described in this step may be understood as a first-time increasing of the Buffer size. Assuming that the initial size is 2 MB, and assuming that the increasing is performed according to a fixed scaling step size, and this scaling step size is 1 MB, then a new Buffer size obtained after the first-time increasing is 3 MB.

In addition, after the first-time increasing of the Buffer size is performed, it may re-detect to obtain the actual bandwidth value of a current communication link (hereinafter referred to as the new actual bandwidth value to distinguish it from an original actual bandwidth value obtained by detection before the increasing of the Buffer size in the current round).

Step 502: determining whether the new actual bandwidth value is greater than an original actual bandwidth value obtained by detection before the increasing of the Buffer size is performed, if yes, performing step 503, otherwise, performing step 504.

On the basis of step 501, this step aims to determine, by the above executing body, whether the new actual bandwidth value is greater than the original actual bandwidth value detected before the increasing of the Buffer size is performed, and to execute different processing branches based on the two determination results, respectively.

Step 503: continue to increase a current size of the Buffer size.

This step is established on the basis that the determination result in step 502 is that the new actual bandwidth value is greater than the original actual bandwidth value, indicating that the processing method of increasing the Buffer size at this round is effective, and that there is still room for further increasing the Buffer size.

To confirm whether the increasing of the Buffer size in a new round has achieved the desired effect and is effective, the method skips back to step 502 to re-evaluate whether the bandwidth values detected before and after the increasing of the Buffer size in this new round also show an increase. If the same increase continues, step 503 will be repeatedly executed until no further increase occurs, and then it may be assumed that there is no more room for further increasing Buffer size.

Step 504: determining the current size of the Buffer size as the target size.

This step is established on the basis that the determination result in step 502 is that the new actual bandwidth value is not greater than the original actual bandwidth value, i.e., it should be manifested that the new actual bandwidth value is equal to the original actual bandwidth value. Then, it may be assumed that the last increasing of the Buffer size is ineffective. Therefore, it may determine the Buffer size, obtained after the last effective size increasing, as the target size.

Here, the increasing of the Buffer size includes the following.

The Buffer size is increased by a uniform scaling strategy by a fixed step size (such as the Buffer size is increased by a scaling step size of 1 MB mentioned in the above example) or by a non-uniform scaling strategy by a variable step size. Compared to the uniform scaling strategy, the non-uniform scaling strategy aims at reducing iterations of the increasing by using a larger step size when the Buffer size should be increased quickly, and accurately approximating the target size by using a smaller step size when the Buffer size should be increased slowly.

An implementation, including but not limited to, may be as follows.

When the Buffer size is increased by the non-uniform scaling strategy by a variable step size, the Buffer size is increased on the basis of the initial size using exponential increase followed by linear increase until the detected actual bandwidth value no longer increases, to obtain the target size; where, a switching point from the exponential increase to the linear increase occurs when an increase ratio of the new actual bandwidth value detected after the exponential increase, compared to the original actual bandwidth value detected before the corresponding exponential increase, is lower than an increase ratio of the Buffer size.

The reason for initially using exponential increase is that the initial size is usually small and far from a size upper limit of the Buffer size. By using exponential increase, the method rapidly approximates the size upper limit. It should be understood that if the increase ratio of the bandwidth value detected before and after each exponential increase of the Buffer size is not less than the increase ratio of the Buffer size itself, it indicates that the current increasing of the Buffer size has actually not yet reached the bandwidth value's upper limit. Therefore, exponential increase may continue, and even an increase rate of the exponential increase may be further turned up. However, if it is found that the increase ratio of the bandwidth value detected before and after a certain exponential increase of the Buffer size is less than the increase ratio of the Buffer size, it indicates that the bandwidth value's upper limit has been preliminarily reached in the current round of adjusting the Buffer size. That is, the increase ratio of the Buffer size at this round has exceeded the increase ratio of the bandwidth value. Therefore, the Buffer size after this round of increasing is inaccurate and mismatched with the currently detected actual bandwidth value. Therefore, it may switch to linear increase to explore upward the most accurate target size with a smaller ratio, based on the Buffer size after the last effective exponential increase. That is, the target size should be the Buffer size after the last effective linear increase.

Further, an increase step size of linear increase doesn't have to be fixed and may also start large and then become small. That is, an increase ratio of the first linear increase may be determined based on actual bandwidth increase ratio(s) before and/or after a last exponential increase. An increase ratio of non-first linear increase may be determined based on actual bandwidth increase ratio(s) obtained before and/or after a preceding linear increase.

Furthermore, the size upper limit of the Buffer size may be determined based on the bandwidth upper limit of the NIC hardware and the connection count upper limit of the RDMA connection count (the connection count upper limit is obtained based on the bandwidth upper limit, which can be obtained by referring to the corresponding description in the embodiment shown in FIG. 4). After determining this size upper limit, the above executing body may also control the increased size after the last exponential increase to be less than the size upper limit, to prevent the last exponential increase from increasing the Buffer size to a value beyond the size upper limit.

On the basis of any of the above embodiments, considering that cross-cluster communication is more susceptible to uncontrollable network environments or network quality fluctuations, and that any degradation in network quality may lead to reduced actual available bandwidth, it is necessary to timely adjust the cross-cluster transmission parameter based on the actual available bandwidth, so as to optimize cross-cluster communication by adapting the cross-cluster transmission parameter to the actual network bandwidth.

Figure 6:
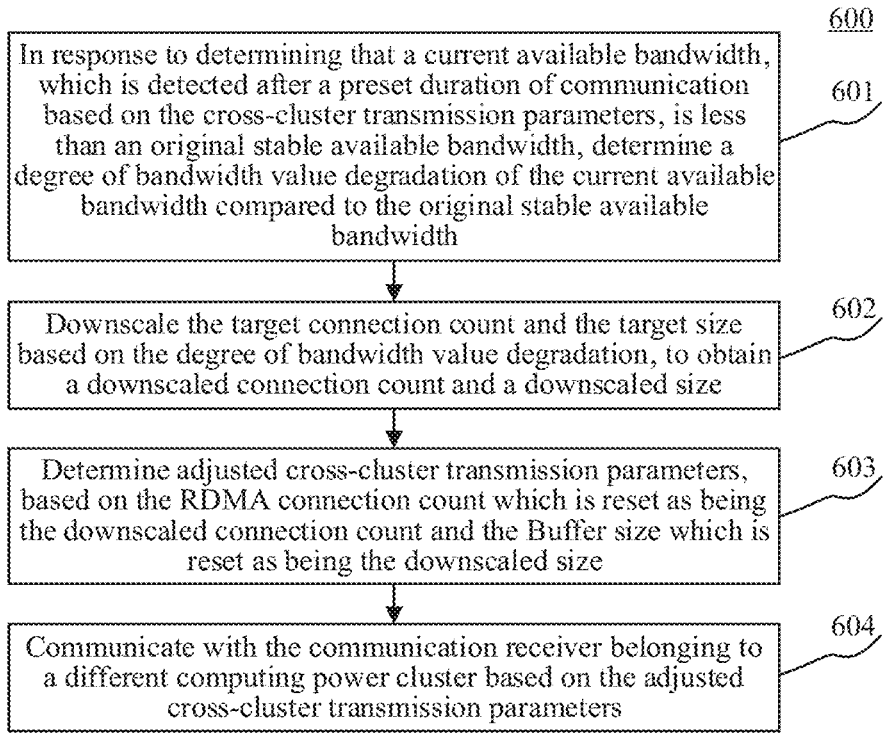
FIG. 6 is a flowchart of a method for adjusting a cross-cluster transmission parameters based on a degree of bandwidth value degradation provided according to an embodiment of the present disclosure.

In particular, referring to FIG. 6, FIG. 6 is a flowchart of a method for adjusting cross-cluster transmission parameters based on a degree of bandwidth value degradation provided according to an embodiment of the present disclosure, where a flow 600 includes the following steps.

Step 601: in response to a current available bandwidth, detected after a preset duration of communication according to the cross-cluster transmission parameters, being less than an original stable available bandwidth, determining a degree of bandwidth value degradation of the current available bandwidth compared to the original stable available bandwidth.

This step aims to determine, by the above executing body, the degree of bandwidth value degradation of the current available bandwidth compared to the original stable available bandwidth, in the event that the current available bandwidth detected after the preset duration of the communication according to the cross-cluster transmission parameters is less than the original stable available bandwidth.

Step 602: downscaling the target connection count and the target size, based on the degree of bandwidth value degradation, to obtain a downscaled connection count and a downscaled size.

On the basis of step 601, this step aims to downscale the target connection count and the target size by the above executing body based on the degree of bandwidth value degradation, to obtain the downscaled connection count and the downscaled size. In downscaling the target connection count and the target size based on the degree of bandwidth value degradation, downscaling ratios of the target connection count and the target size may be set slightly higher than the degree of bandwidth value degradation, then the executing body may keep exploring upward from a downscaled initial connection count and a downscaled initial size, until during the upward exploration, the downscaled connection count and the downscaled size matched to the current available bandwidth at the actual moment are obtained.

Step 603: determining adjusted cross-cluster transmission parameters, based on the RDMA connection count reset as the downscaled connection count and the Buffer size reset as the downscaled size.

Step 604: communicating with the communication receiver belonging to a different computing power cluster according to the adjusted cross-cluster transmission parameters.

The present embodiment provides, through steps 601-604, a solution for re-adjusting cross-cluster transmission parameters when network fluctuations occur during cross-cluster communication, to obtain new cross-cluster transmission parameters matching the actual situation, so as to communicate with the communication receiver in a different computing power cluster based on the adjusted cross-cluster transmission parameters, so as to optimize cross-cluster communication by adapting the cross-cluster transmission parameters to the actual network bandwidth.

In order to deepen the understanding, an embodiment of the present disclosure further incorporates an application scenario, in which existing problems, problem-solving ideas, and the process of specific implementation solutions are given in detail.

With the gradual expansion of training computation in the era of large models, an increasing number of chips and increasingly larger computing power clusters are required. Building a single computing power cluster with a scale of hundreds of thousands of cards, while enabling an extreme computational efficiency, imposes extremely high requirements on the infrastructure and the cluster with a scale of hundreds of thousands of cards may not be able to be accommodated in a single machine room. At the same time, in training scenarios requiring tens of thousands of cards, utilizing multiple clusters with a scale of thousands of cards not only can reduce the construction costs of clusters with tens of thousands of cards, but also can efficiently utilize fragmented clusters with a scale of thousands of cards and activate the supply of computing power. Therefore, hybrid cross-location training across multiple machine rooms (multiple machine rooms in this context is a simplified representation in the case of equating one computing power cluster to one machine room) may be a viable option for facing future training based on large-scale cards such as tens of thousands of cards.

Figures 1, 7:
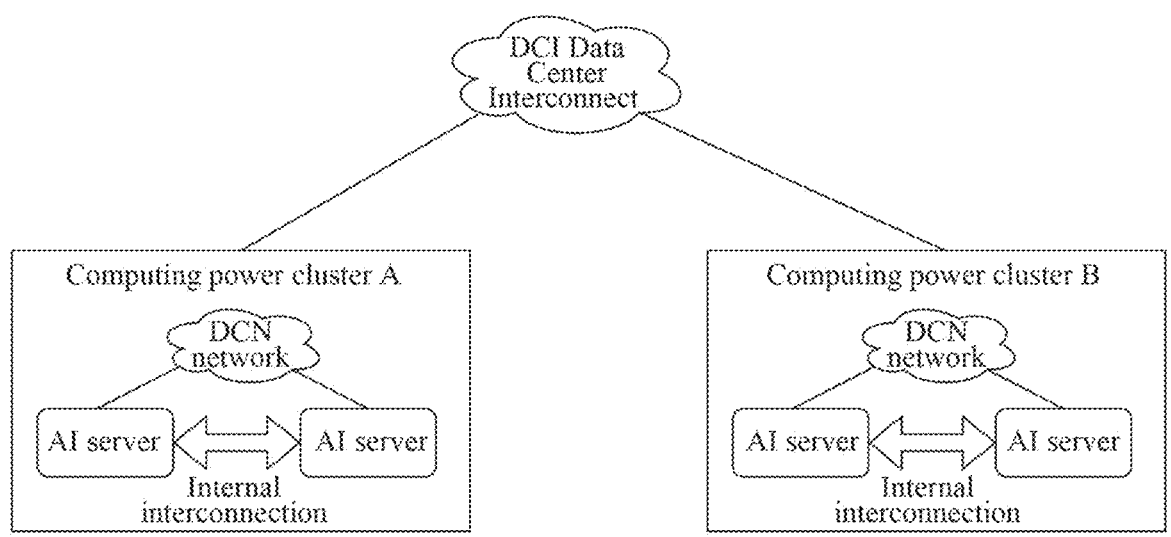
Figures 2, 7:
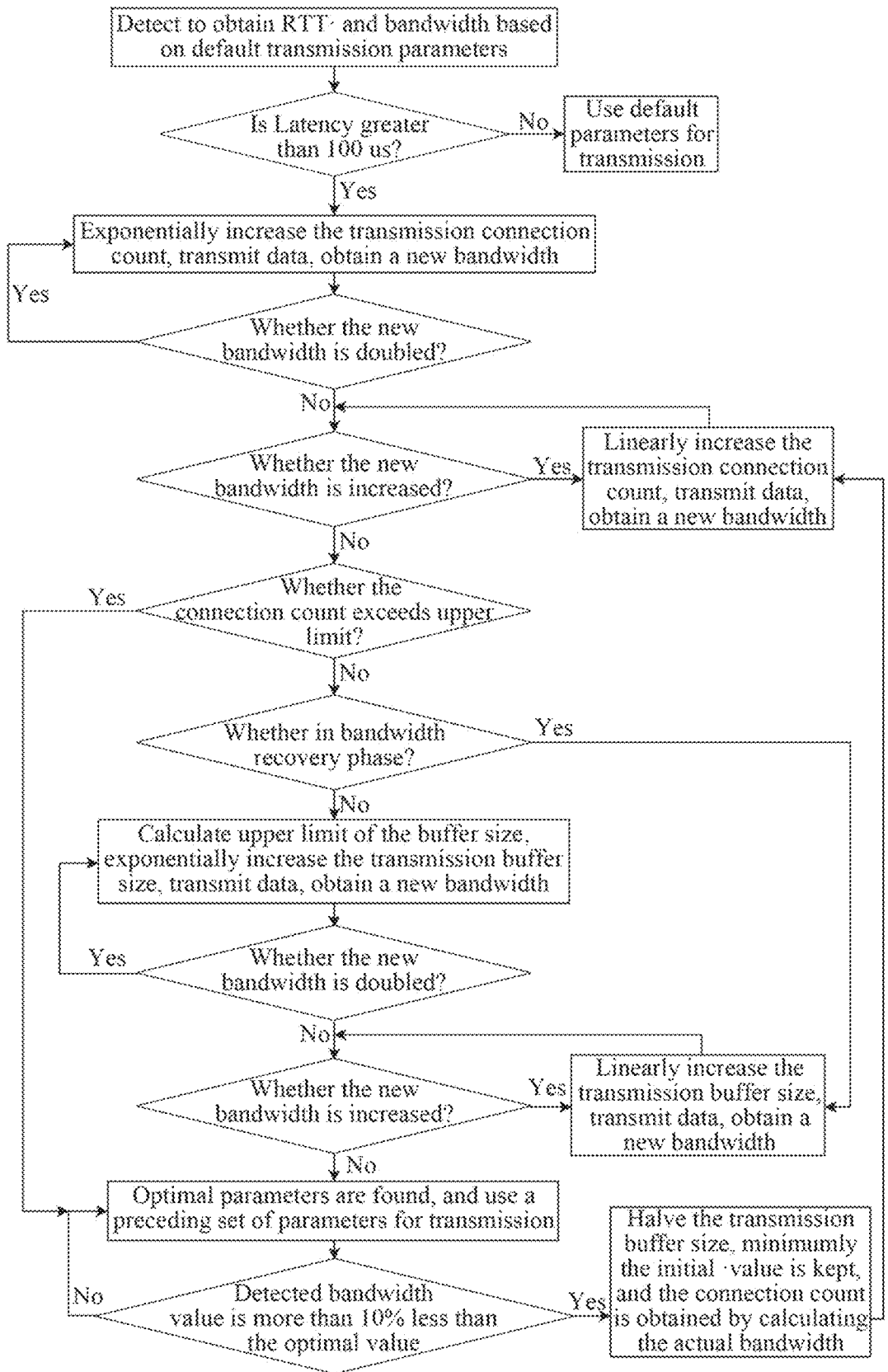

Communication between resources across data centers needs to be implemented through DCI (Data Center Interconnect Network) network, as shown in FIG. 7-1. The core challenge of hybrid cross-location training lies in the high latency and low bandwidth of the DCI network, which typically exhibits 1-2 ms latency and approximately 1T bandwidth due to cost constraints. Therefore, meticulous optimization of interconnection and communication technologies, along with adjusting adaptive parallelization strategies, is essential to prevent communication latency from becoming the critical bottleneck. The DCNs (Data Center Network) shown in FIG. 7-1 are components common to the interconnection by the DCI network.

Splitting a model into different computer rooms according to pipeline is a common strategy, since pipeline parallelism, i.e., PP (Point-to-Point) transmission, typically only involves point-to-point data transfer without complex Allreduce Ring (an implementation method for Allreduce operations in distributed computing) or Tree algorithms, PP splitting a model to different computer rooms is given priority. For PP transmission cross machine rooms, transmission parameters of the communication library (such as a transmission buffer size and a transmission connection count) need to be adjusted to accommodate the high latency of the DCI network. For different latency and bandwidth scenarios, the most appropriate transmission parameters are usually different and need to be meticulously designed and adjusted. pp transmission occurs both in the same machine room and across machine rooms. Since the latency and bandwidth capacity for the same machine room and across machine rooms are different, it may configure different transmission parameters for the two scenarios. However, existing collective communication libraries such as NCCL or gloo, used for GPU training, do not support the function of automatically adjusting transmission parameters based on the link bandwidth and latency. These communication libraries can only be statically configured when initiating training tasks, leading to inability to adapt to cross-data center training scenarios.

Therefore, the present embodiment needs to implement the following key features to overcome the existing technical drawbacks.

1) capable of automatically detecting a cross-machine room communication latency and an available link bandwidth;
2) capable of automatically configuring an appropriate Buffer size and connection count for the transmission based on the communication latency and the bandwidth, and adjusting dynamically in real time based on a link condition.

That is, the present embodiment aims to provide a link bandwidth and latency adaptative strategy for adjusting PP transmission parameters. The strategy enables collective communication libraries to automatically configure transmission parameters (e.g., connection count, Buffer size) based on the link bandwidth and the latency, is particularly suitable for hybrid cross-location training scenarios where intra-machine room and cross-machine room PP transmissions coexist with inconsistent latency and bandwidth, to overcome the technical drawbacks of current related solutions: can only support static configuration, only adapt to a single scenario, and lack flexibility. The following elaborates on specific implementation means through expanded description.

I. Detection of Cross-Machine Room Communication Latency and Bandwidth

The collective communication library NCCL uses RDMA during cross-machine room transmission, record the start time when data is sent out via RDMA, and record the end time after receiving a corresponding returned acknowledgment. In this way, a round-trip latency of data at the communication library transmission level may be counted. Meanwhile, based on msgsize (actual data size) of the transmission, a communication bandwidth may be calculated. Using this method, a relatively accurate transmission latency and transmission bandwidth may be obtained, laying the groundwork for subsequent automatic adjustment of transmission parameters. At the same time, if this latency is greater than a certain threshold (for example, 100 us), this scenario may be considered as a cross-machine room transmission scenario, and the following strategy may only take effect in cross-machine room transmission scenarios.

II. Automatic Configuration of Appropriate Transmission Parameters Based on Communication Latency and Bandwidth Assuming that a default value of the maximum sending buffer $S_{init}$ and the latency Rtt are known, then, a formula for calculating a maximum available bandwidth $B_{max}$ is:

$$B_{max} = \frac{S_{init}}{Rtt} * 8. \qquad \text{(Formula 1)}$$

The default Buffer size of RDNA transmission of the collective communication library NCCL is 4 MB, when the RTT delay is 2 ms, according to Formula 1, the maximum available bandwidth is approximately 16 Gbps. To fully utilize a 200G network, at least 13 connections are required;

for gloo, a communication library mainly used for CPU communication, it lacks the capability for multiple connections, and can only use a single connection for operation. Therefore, how to appropriate set transmission parameters when the cross-machine room latency and bandwidth are known, is the focus of the present embodiment. In the present embodiment, the following strategy may be used to set the appropriate transmission parameters.

Whether it is a cross-machine room scenario is determined based on a measured transmission latency. In the present embodiment, based on empirical values, a latency threshold is set to be 100 us. Since the latency of intra-machine room transmission is usually several tens of microseconds, if the latency exceeds 100 us, it may be considered to be cross-machine room transmission, and when it is determined to be a non-cross-machine room scenario (i.e., intra-machine room communication, or intra-cluster communication), the original strategy of the communication library is maintained without any changes. If it is determined to be a cross-machine room scenario, the subsequent strategy described below takes effect.

The overall strategy adopts a heuristic algorithm. Based on default parameters, the connection count and the Buffer size are gradually increased. Under the condition of using the new parameters, the bandwidth value is calculated each time. If the bandwidth value increases, it indicates that a new available bandwidth has been detected. Continue increasing the parameters until the bandwidth value no longer increases, which indicates that an appropriate bandwidth value has been found. Then, this set of connection count and Buffer size achieving the appropriate bandwidth value may be used as the subsequent transmission parameters. The particular strategy is described below.

1) Adjusting the Transmission Connection Count and the Buffer Size Using Exponential Increase Followed by Linear Increase, and Prioritizing Adjusting the Connection Count to Tind Optimal Parameters The reason for prioritizing increasing the connection count before increasing the Buffer size is that increasing the Buffer size usually leads to more usage of a video memory. Moreover, increasing the connection count inherently implies an increase in the Buffer size, because there is one Buffer for each connection. Therefore, if bandwidth utilization may be improved by scaling the connection count, etc., adjustment of the Buffer size should be postponed as much as possible to ensure saving of video memory usage as much as possible.

In other words, if the above considerations are disregarded and there is no need to worry about remaining video memory, it is also feasible to first increase the Buffer size and then increase the RDMA connection count.

The increasing of the connection count and the Buffer size in the detection phase is described as follows: in first sending, a default 4 MB transmission buffer size and 1 connection are used. After completing the bandwidth calculation, the sending connection count is adjusted to be 2, and continue sending. The connection count continues increasing using exponential increase. The calculation method of a new bandwidth value $B_{new}$ is:

$$B_{new} = \frac{S_{init} * C_{new} * 8}{Rtt}. \qquad \text{(Formula 2)}$$

If the new bandwidth value $B_{new}$ is not doubled when the connection count $C_{new}$ is doubled, then the next connection count is increased by only one connection in a next round until the bandwidth value no longer increases; in subsequent adjustments, it then choses to increase the transmission Buffer size, also using exponential increase followed by linear increase. Here, increasing the connection count is prioritized. Only when the connection count can no longer be increased will the Buffer size be further increased to avoid excessive buffer consumption and waste of video memory. Usually, a set of parameters may be found using this method. Once the bandwidth no longer increases after setting these parameters, it may be considered that an appropriate set of parameters has been found.

2) Dynamic Calculation of Upper Limits of Transmission Buffer Size and Connection Count The transmission Buffer size and connection count cannot be increased infinitely. The following strategy may be used to dynamically determine the upper limits: usually, a NIC bandwidth of a GPU server is fixed, input may be preset or a TOPO detection result of the collective communication library NCCL may be used as input. Then, the upper limit of the connection count $C_{top}$ may be calculated using the following formula, where the bandwidth upper limit of the NIC hardware is $B_{NIC}$:

$$C_{top} = \frac{B_{NIC} * Rtt}{S_{init} * 8}. \qquad \text{(Formula 3)}$$

Assuming that the NIC bandwidth available for each GPU is 400 Gbps, the detected RTT latency is 2 ms, and the sending Buffer size is set to the default 4 MB. According to Formula 3, it may be known from calculation that approximately 25 connections are required. Therefore, the maximum connection count is set to be 25. The entire process may be dynamically detected. For different machine room latencies, the RTT may vary, so the calculated maximum connection count may also differ. The upper limit of the sending Buffer size is calculated after the optimal connection count has been detected. A maximum adjustable value of the sending Buffer size may be calculated as follows:

$$B_{NIC} = \frac{(S_{Init} + S_{Max}) * C_{max}}{Rtt} * 8. \qquad \text{(Formula 4)}$$

Assuming that the bandwidth no longer increases after the connection count is increased to 16. Then, in the formula, $C_{max}=16$. Also, calculation is performed according to the bandwidth upper limit of 400 Gbps, then $B_{NIC}=400$ Gbps, the sending Buffer size reaches its maximum and Rtt=2 ms, according to Formula 4, $S_{init}+S_{Max}$ can only reach 6.25 MB. Therefore, the upper limit is rounded down and set to be 6 MB, and $S_{max}$ is limited to a maximum increasing of 2 MB.

Two solutions may be selected for the PP transmission interconnection between cross-location machine rooms: when rear-end RDMA NICs used by GPU servers may be directly interconnected via the DCI network, the transmission bandwidth of the NIC available for each GPU is usually large. Therefore, theoretical upper limits of the parameters are calculated as described above. When the rear-end RDMA NICs in different machine rooms cannot be directly interconnected, cross-machine room PP transmission needs to use the main NIC of the GPU server for transmission. In this regard, all the GPUs of the entire machine can only share the bandwidth of the main NIC for transmission. As a result, the calculated theoretical upper limits of the parameters may not be very high, therefore, the detection process may not last for a long time.

3) Parameter Adjustment After Bandwidth Stabilization

When the appropriate bandwidth value has been detected and during stable transmission using the appropriate parameters, the available bandwidth of the link itself may decrease due to congestion, which may be found through latency and bandwidth detection. When this situation occurs, to prevent the continuous decline in performance caused by the persistent use of outdated parameters, it may make corresponding adjustments to the Buffer size and the connection count. As for the Buffer size, one adoptable strategy is to halve its size, yet it should not be lower than the default value of the Buffer size. The calculation method is as shown in Formula 5 as follows:

$$S_{new} = \max(S_{init}, S_{max}/2). \quad \text{(Formula 5)}$$

As for adjusting the connection count, a new connection count value may be dynamically calculated based on the adjusted Buffer value and the newly detected reduced bandwidth value. Assuming that the new bandwidth value is $B_{new}$ and the current connection count is $C_{max}$, the method for calculating an adjusted connection count $C_{new}$ is as shown in the following formula:

$$C_{new} = \frac{B_{new} * Rtt}{S_{new} * 8}. \quad \text{(Formula 6)}$$

Assuming that the connection count is 16, and the bandwidth decreases from 160 Gbps to 120 Gbps, and assuming that the Buffer size remains at 4 MB, according to the above formula, the adjusted connection count should be reduced to be 7.

After the adjustment, it may re-find an appropriate parameter. In this regard, the bandwidth may be re-detected. Since the system is in a bandwidth recovery phase, both the connection count and the Buffer size may directly enter the linear increase phase, and will not enter the exponential increase phase.

For the convenience of understanding, a specific example is provided below to illustrate each step in detail, reference may also be made to FIG. 7-2 for better viewing and understanding.

①: Assuming that the NCCL communication library is initialized with a Buffer size of 4 MB per connection, the RDMA connection count used is 1, and the Rtt is 2 ms. Since the latency exceeds 100 us, the system enters the bandwidth and latency detection phase;

②: Connection count upper limit calculation: according to Formula 3, the upper limit of the connection count is calculated to be 25;

③: Connection count exponential detection: increasing the connection count to be 2, according to Formula 2, the obtained new bandwidth value is approximately 32 Gbps, assuming that the bandwidth obtained by the detection reaches an expected value, then continue to increase the connection count to be 4, according to Formula 2, the obtained new bandwidth value is approximately 64 Gbps, assuming that the bandwidth obtained by the detection reaches expectation, then continue to increase the connection count to be 8, according to Formula 2, the obtained new bandwidth value is approximately 128 Gbps, assuming that the bandwidth obtained by the detection does not reach expectation, but also increases and reaches 96 Gbps., then, the system enters the linear increase phase;

④: Connection count linear detection: in this regard, the connection count is increased from 8 to 9. Assuming that the bandwidth value does not increase, then the connection count is taken as 8 and the system directly enters the Buffer size increasing phase;

⑤: Buffer size upper limit calculation: according to Formula 4, since the connection count is 8, the calculated Buffer size upper limit is 12.8 MB (rounded down to 12 MB);

⑥: Buffer size exponential increase: increasing the Buffer size from 4 MB to 8 MB. Assuming that the detected bandwidth increases to 100 Gbps (less than the expected doubling), the system directly enters the Buffer size linear increase;

⑦: Buffer size linear increase: increasing the Buffer size by 1 MB from 8 MB to 9 MB, assuming that the bandwidth obtained by detection remains at 100 Bps with no significant increase, the Buffer size is kept at 8 MB and no more detection is performed, then an optimal set of parameters has been obtained, with the connection count being 8, and the sending Buffer size being 8 MB;

⑧: Bandwidth degradation and entering re-detection phase: the bandwidth obtained by detection drops from 100 Gbps to 70 Gbps, exhibiting a 30% drop in bandwidth value, therefore, the Buffer size is halved to 4 MB according to Formula 5, and the connection count is reduced from 8 connections to 4 (rounded down) according to Formula 6, then the system enters the bandwidth re-detection phase; and ⑨: In this regard, the connection count is 4 and the Buffer size is 4 MB. Using this set of values to start over, increasing the connection count linearly, from 4 to 5. Subsequent processes are the same to the above and detailed description thereof will be omitted.

Figure 8:
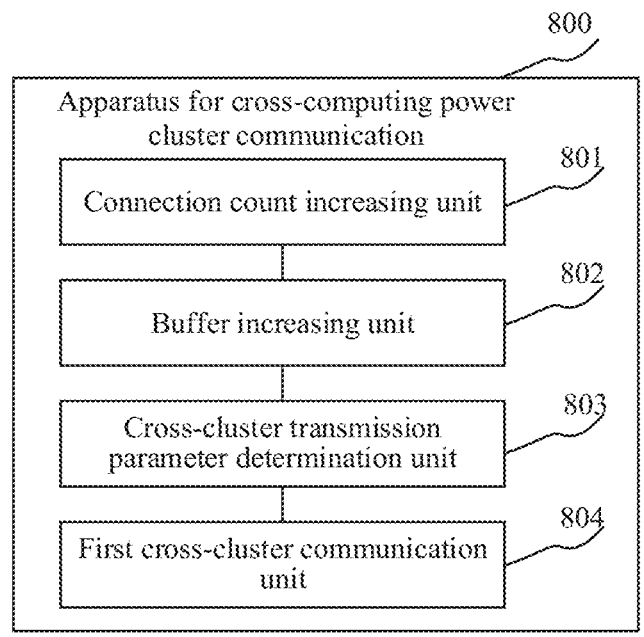
FIG. 8 is a structural block diagram of an apparatus for cross-computing power cluster communication provided according to an embodiment of the present disclosure.

Further referring to FIG. 8, as an implementation of the method shown in each of the above figures, an embodiment of the present disclosure provides an apparatus for cross-computing power cluster communication, which corresponds to the method embodiment shown in FIG. 2, and the apparatus is particularly applicable to various electronic devices.

As shown in FIG. 8, the apparatus 800 for cross-computing power cluster communication of the present embodiment may include: a connection count scaling unit 801, a Buffer scaling unit 802, a cross-cluster transmission parameter determination unit 803 and a first cross-cluster communication unit 804. The connection count scaling unit 801 is configured to, in response to the communication initiator and a communication receiver respectively belonging to different computing power clusters, increase a remote direct memory access (RDMA) connection count on the basis of an initial connection count until a detected actual bandwidth value no longer increases, to obtain a target connection count. The Buffer scaling unit 802 is configured to increase, with the RDMA connection count being maintained at the target connection count, a Buffer size on the basis of an initial size until a detected actual bandwidth value no longer increases, to obtain a target size. The cross-cluster transmission parameter determination unit 803 is configured to determine cross-cluster transmission parameters, based on the RDMA connection count set as the target connection count and the Buffer size set as the target size. The first cross-cluster communication unit 804 is configured to communicate, according to the cross-cluster transmission parameters, with the communication receiver belonging to a different computing power cluster.

In the present embodiment, in the apparatus 800 for cross-computing power cluster communication, the specific processing and the technical effects of the connection count scaling unit 801, the Buffer scaling unit 802, the cross-cluster transmission parameter determination unit 803 and the first cross-cluster communication unit 804 may be described with reference to the related description of steps 201-204 in the corresponding embodiment of FIG. 2, and detailed description thereof will be omitted.

In some alternative implementations of the present embodiment, the apparatus 800 for cross-computing power cluster communication may further include: a different computing power cluster belonging determination unit, configured to, in response to an actual latency between the communication initiator and the communication receiver exceeding a preset latency, determine that the communication initiator and the communication receiver respectively belong to the different computing power clusters.

In some alternative implementations of the present embodiment, the apparatus 800 for cross-computing power cluster communication may further include: an actual latency calculation unit, and the actual latency calculation unit may include: a start moment determination subunit, configured to determine a moment when the communication initiator sends out data to the communication receiver as a start moment; an end moment determination subunit, configured to determine a moment when an acknowledgement notice is received as an end moment, the acknowledgement notice is returned by the communication receiver after receiving the data; and an actual latency calculation subunit, configured to calculate to obtain the actual latency, based on the start moment and the end moment.

In some alternative implementations of the present embodiment, the actual latency calculation subunit may be further configured to: calculate latency values corresponding to a preset number of start-end time pairs composed of start moments and corresponding end moments, to obtain a latency set; and calculate an average of the latency values in the latency set to obtain the actual latency.

In some alternative implementations of the present embodiment, the apparatus 800 for cross-computing power cluster communication may further include: a bandwidth value detection unit, and the bandwidth value detection unit may be further configured to: acquire an actual data transmission size at a moment corresponding to the calculated actual latency; and determine the detected bandwidth value, based on the actual data transmission size and the actual latency.

In some alternative implementations of the present embodiment, the connection count scaling unit 801 may be further configured to: increase the RDMA connection count on the basis of the initial connection count, and detect to obtain a new actual bandwidth value after the increasing of RDMA connection count is performed; in response to the new actual bandwidth value being greater than an original actual bandwidth value obtained by detection before the increasing of RDMA connection count, continue to increase a current RDMA connection count until a subsequently obtained new actual bandwidth value is equal to an original actual bandwidth value obtained by detection before the increasing of the corresponding connection count; and in response to the new actual bandwidth value being equal to the original actual bandwidth value obtained by detection before the increasing of the corresponding RDMA connection count, determine the current RDMA connection count as the target connection count.

In some alternative implementations of the present embodiment, connection count scaling unit is further configured to: increase the RDMA connection count by a uniform scaling strategy by a fixed step size or by a non-uniform scaling strategy by a variable step size.

In some alternative implementations of the present embodiment, the RDMA connection count is increased by the non-uniform scaling strategy by the variable step size, and the connection count scaling unit 801 may be further configured to: increase the RDMA connection count on the basis of the initial connection count using exponential increase followed by linear increase until the detected actual bandwidth value no longer increases, to obtain the target connection count, wherein a switching point from the exponential increase to the linear increase occurs when an increase ratio of the new actual bandwidth value detected after the exponential increase, compared to the original actual bandwidth value detected before the corresponding exponential increase scaling, is lower than an increase ratio of the RDMA connection count.

In some alternative implementations of the present embodiment, the apparatus 800 for cross-computing power cluster communication may further include: a connection count upper limit determination unit, configured to determine a connection count upper limit of the RDMA connection count based on a bandwidth upper limit of a NIC hardware; and a first value controlling unit, configured to control an increased RDMA connection count obtained by a last exponential increase to be less than the connection count upper limit.

In some alternative implementations of the present embodiment, an increase ratio at a first linear increase is determined based on an actual bandwidth increase ratio before and after a last exponential increase; and an increase ratio of at a non-first linear increase is determined based on an actual bandwidth increase ratio before and after a preceding linear increase.

In some alternative implementations of the present embodiment, the Buffer scaling unit 802 may be further configured to: increase the Buffer size on the basis of the initial size, and detect to obtain a new actual bandwidth value after the increasing of the Buffer size is performed; in response to the new actual bandwidth value being greater than an original actual bandwidth value obtained by detection before the increasing of the Buffer size, continue to increase a current size of the Buffer size until a subsequently obtained new actual bandwidth value is equal to an original actual bandwidth value obtained by detection before the increasing of the corresponding Buffer size; and in response to the new actual bandwidth value being equal to the original actual bandwidth value obtained by detection before the increasing of the corresponding size, determine the current size of the Buffer size as the target size.

In some alternative implementations of the present embodiment, the size scaling may include: increase the Buffer size by a uniform scaling strategy by a fixed step size or by a non-uniform scaling strategy by a variable step size.

In some alternative implementations of the present embodiment, the Buffer size is increased by the non-uniform scaling strategy by the variable step size, and the Buffer scaling unit 802 may be further configured to: increase the Buffer size on the basis of the initial size using exponential increase followed by linear increase until the detected actual bandwidth value no longer increases, to obtain the target size; wherein a switching point from the exponential increase to the linear increase occurs when an increase ratio of the new actual bandwidth value detected after the exponential increase, compared to the original actual bandwidth value detected before the corresponding exponential increase, is lower than an increase ratio of the Buffer size.

In some alternative implementations of the present embodiment, the apparatus 800 for cross-computing power cluster communication may further include: a Buffer size upper limit determination unit, configured to determine a size upper limit of the Buffer size, based on a bandwidth upper limit of a NIC hardware and a connection count upper limit of the RDMA connection count; and a second value controlling unit, configured to control an increased size obtained by a last exponential increase to be less than the size upper limit.

In some alternative implementations of the present embodiment, an increase ratio at a first linear increase is determined based on an actual bandwidth increase ratio before and after a last exponential increase; and an increase ratio at a non-first linear increase is determined based on an actual bandwidth increase ratio before and after a preceding linear increase.

In some alternative implementations of the present embodiment, the apparatus 800 for cross-computing power cluster communication may further include: a same computing power cluster belonging determination unit, configured to, in response to the actual latency between the communication initiator and the communication receiver not exceeding the preset latency, determine that the communication initiator and the communication receiver both belong to a same computing power cluster; and an intra-cluster communication unit, configured to communicate with the communication receiver belonging to the same computing power cluster based on an intra-cluster transmission parameter determined by a collective communication library.

In some alternative implementations of the present embodiment, different computing power clusters comprise: computing power clusters for training a generative large language model, composed of graphical processors located in different machine rooms at different locations, respectively; correspondingly, the same computing power cluster comprises: a computing power cluster for training the generative large language model, composed of graphical processors located in a same machine room at a same location.

In some alternative implementations of the present embodiment, the apparatus 800 for cross-computing power cluster communication may further include: a bandwidth value degradation degree determination unit, configured to, in response to a current available bandwidth, detected after a preset duration of communication according to the cross-cluster transmission parameters, being less than an original stable available bandwidth, determine a degree of bandwidth value degradation of the current available bandwidth compared to the original stable available bandwidth; wherein, the original stable available bandwidth is a bandwidth value that matches the cross-cluster transmission parameters; a downscaling unit, configured to downscale the target connection count and the target size, based on the degree of bandwidth value degradation, to obtain a downscaled connection count and a downscaled size; a cross-cluster transmission parameter adjusting unit, configured to determine adjusted cross-cluster transmission parameters, based on the RDMA connection count reset as the downscaled connection count and the Buffer size reset as the downscaled size; and a second cross-cluster communication unit, configured to communicate with the communication receiver belonging to a different computing power cluster based on the adjusted cross-cluster transmission parameters.

The present embodiment serves as an apparatus embodiment corresponding to the above method embodiment. The present embodiment provides an apparatus for cross-computing power cluster communication that, for a situation in which a communication initiator and a communication receiver respectively belong to different computing power clusters, a method for re-determining cross-cluster transmission parameters matching a cross-cluster communication environment is provided, i.e., for the cross-cluster communication having a significantly increased latency compared to intra-cluster communication, a method for successively increasing a remote direct memory access (RDMA) connection count and a Buffer size is provided for the cross-cluster communication, to determine a target connection count and a target size that match an actual bandwidth value, then communicate with the communication receiver belonging to a different computing power cluster according to the cross-cluster transmission parameters determined based on the target connection count and the target size, so that the cross-cluster communication and the intra-cluster communication use transmission parameters matching their respective actual communication environments, thus improving an overall communication efficiency and a data transmission volume, thereby improving the training efficiency of generative large language model(s) and reducing the time required for training.

According to an embodiment of the present disclosure, an electronic device is provided, the electronic device including: at least one processor; and a memory communicatively connected to the at least one processor; where, the memory stores instructions executable by the at least one processor, and the instructions, when executed by the at least one processor, cause the at least one processor to perform the method for cross-computing power cluster communication described in any one of the above embodiments.

According to an embodiment of the present disclosure, a readable storage medium is provided, the readable storage medium storing computer instructions, where the computer instructions are used to cause the computer to perform the method for cross-computing power cluster communication described in any one of the above embodiments.

According to an embodiment of the present disclosure, a computer program product is provided, including a computer program, the computer program, when executed by a processor, implements the method for cross-computing power cluster communication described in any one of the above embodiments.

Figure 9:
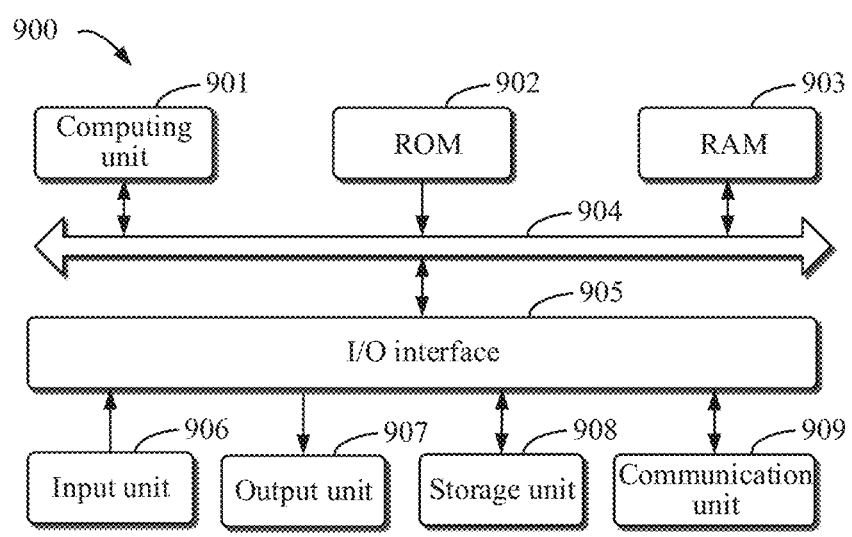
FIG. 9 is a structural schematic diagram of an electronic device adapted to perform the method for cross-computing power cluster communication provided according to an embodiment of the present disclosure.

FIG. 9 shows a schematic block diagram of an example electronic device 900 that may be configured to implement embodiments of the present disclosure. The electronic device is intended to represent various forms of digital computers, such as a laptop, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 9, the device 900 includes a computing unit 901, which may execute various appropriate actions and processes in accordance with a computer program stored in a read-only memory (ROM) 902 or a computer program loaded into a random-access memory (RAM) 903 from a storage unit 908. The RAM 903 may further store various programs and data required by operations of the device 900. The computing unit 901, the ROM 902, and the RAM 903 are connected to each other through a bus 904. An input/output (I/O) interface 905 is also connected to the bus 904.

A plurality of components in the device 900 is connected to the I/O interface 905, including: an input unit 906, such as a keyboard and a mouse; an output unit 907, such as various types of displays and speakers; the storage unit 908, such as a magnetic disk and an optical disk; and a communication unit 909, such as a NIC, a modem, and a wireless communication transceiver. The communication unit 909 allows the device 600 to exchange information/data with other devices via a computer network such as the Internet and/or various telecommunication networks.

The computing unit 901 may be various general-purpose and/or dedicated processing components having processing and computing capabilities. Some examples of the computing unit 901 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 901 performs the various methods and processes described above, such as the method for cross-computing power cluster communication. For example, in some embodiments, the method for cross-computing power cluster communication may be implemented as a computer software program, which is tangibly included in a machine readable medium, such as the storage unit 908. In some embodiments, part or all of the computer program may be loaded and/or installed on the device 900 via the ROM 902 and/or the communication unit 909. When the computer program is loaded into the RAM 903 and executed by the computing unit 901, one or more steps of the method for cross-computing power cluster communication described above may be performed. Alternatively, in other embodiments, the computing unit 901 may be configured to perform the method for cross-computing power cluster communication by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The Server could be a cloud server, also known as cloud computing server or cloud host, which is a host product in the cloud computing service system to solve the defects of difficult management and weak business scalability in the traditional physical host and Virtual Private server (VPS, Virtual Private Server) service. The server may also be classified as distributed system servers, or a server that combines a blockchain.

According to the technical solution of embodiments of the present disclosure, for a situation in which a communication initiator and a communication receiver respectively belong to different computing power clusters, a method for re-determining cross-cluster transmission parameters matching a cross-cluster communication environment is provided, i.e., for the cross-cluster communication having a significantly increased latency compared to intra-cluster communication, a method for successively scaling a remote direct memory access (RDMA) connection count and a Buffer size is provided for the cross-cluster communication, to determine a target connection count and a target size that match an actual bandwidth value, then communicate with the communication receiver belonging to a different computing power cluster according to the cross-cluster transmission parameters determined based on the target connection count and the target size, so that the cross-cluster communication and the intra-cluster communication use transmission parameters matching their respective actual communication environments, thus improving an overall communication efficiency and a data transmission volume, thereby improving the training efficiency of generative large language models and reducing the time required for training.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for cross-computing power cluster communication, applied to a communication initiator, comprising:
   in response to the communication initiator and a communication receiver respectively belonging to different computing power clusters, increasing a remote direct memory access (RDMA) connection count on the basis of an initial connection count until a detected actual bandwidth value no longer increases, to obtain a target connection count;
   increasing, with the RDMA connection count being maintained at the target connection count, a Buffer size on the basis of an initial size until a detected actual bandwidth value no longer increases, to obtain a target size;
   determining cross-cluster transmission parameters, based on the RDMA connection count set as the target connection count and the Buffer size set as the target size; and
   communicating, according to the cross-cluster transmission parameters, with the communication receiver belonging to a different computing power cluster.

2. The method according to claim 1, further comprising:
   in response to an actual latency between the communication initiator and the communication receiver exceeding a preset latency, determining that the communication initiator and the communication receiver respectively belong to the different computing power clusters.

3. The method according to claim 2, wherein the actual latency is calculated through steps as follows:
   determining a moment when the communication initiator sends out data to the communication receiver as a start moment;
   determining a moment when an acknowledgement notice is received as an end moment, the acknowledgement notice is returned by the communication receiver after receiving the data; and
   calculating to obtain the actual latency, based on the start moment and the end moment.

4. The method according to claim 3, wherein the calculating to obtain the actual latency, based on the start moment and the end moment, comprises:
   calculating latency values corresponding to a preset number of start-end time pairs composed of start moments and corresponding end moments, to obtain a latency set; and
   calculating an average of the latency values in the latency set to obtain the actual latency.

5. The method according to claim 3, wherein the detected bandwidth value is obtained by detection through steps as follows:
   acquiring an actual data transmission size at a moment corresponding to the calculated actual latency; and
   determining the detected bandwidth value, based on the actual data transmission size and the actual latency.

6. The method according to claim 1, wherein the increasing a RDMA connection count on the basis of an initial connection count until a detected actual bandwidth value no longer increases, comprises:
   increasing the RDMA connection count on the basis of the initial connection count, and detecting to obtain a new actual bandwidth value after the increasing of RDMA connection count is performed;
   in response to the new actual bandwidth value being greater than an original actual bandwidth value obtained by detection before the increasing of the RDMA connection count, continuing to increase a current RDMA connection count until a subsequently obtained new actual bandwidth value is equal to an original actual bandwidth value obtained by detection before the increasing of the corresponding connection count; and
   in response to the new actual bandwidth value being equal to the original actual bandwidth value obtained by detection before the increasing of the corresponding RDMA connection count, determining the current RDMA connection count as the target connection count.

7. The method according to claim 6, wherein the increasing the RDMA connection count comprises:

increasing the RDMA connection count by a uniform scaling strategy by a fixed step size or by a non-uniform scaling strategy by a variable step size.

8. The method according to claim 7, wherein the RDMA connection count is increased by the non-uniform scaling strategy by the variable step size, and the increasing a RDMA connection count on the basis of an initial connection count until a detected actual bandwidth value no longer increases, to obtain a target connection count, comprises:
increasing the RDMA connection count on the basis of the initial connection count using exponential increase followed by linear increase until the detected actual bandwidth value no longer increases, to obtain the target connection count, wherein a switching point from the exponential increase to the linear increase occurs when an increase ratio of the new actual bandwidth value detected after the exponential increase, compared to the original actual bandwidth value detected before the corresponding exponential increase, is lower than an increase ratio of the RDMA connection count.

9. The method according to claim 8, further comprising:
determining a connection count upper limit of the RDMA connection count based on a bandwidth upper limit of a NIC hardware; and
controlling an increased RDMA connection count obtained by a last exponential increase to be less than the connection count upper limit.

10. The method according to claim 8, wherein an increase ratio at a first linear increase is determined based on an actual bandwidth increase ratio before and after a last exponential increase; and an increase ratio of at a non-first linear increase is determined based on an actual bandwidth increase ratio before and after a preceding linear increase.

11. The method according to claim 1, wherein the increasing a Buffer size on the basis of an initial size until a detected actual bandwidth value no longer increases, to obtain a target size, comprises:
increasing the Buffer size on the basis of the initial size, and detecting to obtain a new actual bandwidth value after the increasing of the Buffer size is performed;
in response to the new actual bandwidth value being greater than an original actual bandwidth value obtained by detection before the increasing of the Buffer size, continuing to increase a current size of the Buffer size until a subsequently obtained new actual bandwidth value is equal to an original actual bandwidth value obtained by detection before the increasing of the corresponding Buffer size; and
in response to the new actual bandwidth value being equal to the original actual bandwidth value obtained by detection before the increasing of the corresponding size, determining the current size of the Buffer size as the target size.

12. The method according to claim 11, wherein the increasing the Buffer size comprises:
increasing the Buffer size by a uniform scaling strategy by a fixed step size or by a non-uniform scaling strategy by a variable step size.

13. The method according to claim 12, wherein Buffer size is increased by the non-uniform scaling strategy by the variable step size, and the increasing a Buffer size on the basis of an initial size until a detected actual bandwidth value no longer increases, to obtain a target size, comprises:
increasing the Buffer size on the basis of the initial size using exponential increase followed by linear increase until the detected actual bandwidth value no longer increases, to obtain the target size; wherein a switching point from the exponential increase to the linear increase occurs when an increase ratio of the new actual bandwidth value detected after the exponential increase, compared to the original actual bandwidth value detected before the corresponding exponential increase, is lower than an increase ratio of the Buffer size.

14. The method according to claim 13, further comprising:
determining a size upper limit of the Buffer size, based on a bandwidth upper limit of a NIC hardware and a connection count upper limit of the RDMA connection count; and
controlling an increased size obtained by a last exponential increase to be less than the size upper limit.

15. The method according to claim 13, wherein an increase ratio at a first linear increase is determined based on an actual bandwidth increase ratio before and after a last exponential increase; and an increase ratio at a non-first linear increase is determined based on an actual bandwidth increase ratio before and after a preceding linear increase.

16. The method according to claim 2, further comprising:
in response to the actual latency between the communication initiator and the communication receiver not exceeding the preset latency, determining that the communication initiator and the communication receiver both belong to a same computing power cluster; and
communicating with the communication receiver belonging to the same computing power cluster based on an intra-cluster transmission parameter determined by a collective communication library.

17. The method according to claim 1, wherein different computing power clusters comprise: computing power clusters for training a generative large language model, composed of graphical processors located in different machine rooms at different locations, respectively; correspondingly, the same computing power cluster comprises: a computing power cluster for training the generative large language model, composed of graphical processors located in a same machine room at a same location.

18. The method according to claim 1, wherein the method further comprises:
in response to a current available bandwidth, detected after a preset duration of communication according to the cross-cluster transmission parameters, being less than an original stable available bandwidth, determining a degree of bandwidth value degradation of the current available bandwidth compared to the original stable available bandwidth; wherein, the original stable available bandwidth is a bandwidth value that matches the cross-cluster transmission parameters;
downscaling the target connection count and the target size, based on the degree of bandwidth value degradation, to obtain a downscaled connection count and a downscaled size;
determining adjusted cross-cluster transmission parameters, based on the RDMA connection count reset as the downscaled connection count and the Buffer size reset as the downscaled size; and
communicating with the communication receiver belonging to a different computing power cluster based on the adjusted cross-cluster transmission parameters.

19. An electronic device, comprising:
at least one processor; and
a memory communicatively connected to the at least one processor; wherein, the memory stores instructions executable by the at least one processor, and the instructions, when executed by the at least one processor, cause the at least one processor to perform operations, the operations comprising:

in response to a communication initiator and a communication receiver respectively belonging to different computing power clusters, increasing a remote direct memory access (RDMA) connection count on the basis of an initial connection count until a detected actual bandwidth value no longer increases, to obtain a target connection count;

increasing, with the RDMA connection count being maintained at the target connection count, a Buffer size on the basis of an initial size until a detected actual bandwidth value no longer increases, to obtain a target size;

determining cross-cluster transmission parameters, based on the RDMA connection count set as the target connection count and the Buffer size set as the target size; and communicating, according to the cross-cluster transmission parameters, with the communication receiver belonging to a different computing power cluster.

20. A non-transitory computer readable storage medium storing computer instructions, wherein, the computer instructions are used to cause the computer to perform operations, the operations comprising:

in response to a communication initiator and a communication receiver respectively belonging to different computing power clusters, increasing a remote direct memory access (RDMA) connection count on the basis of an initial connection count until a detected actual bandwidth value no longer increases, to obtain a target connection count;

increasing, with the RDMA connection count being maintained at the target connection count, a Buffer size on the basis of an initial size until a detected actual bandwidth value no longer increases, to obtain a target size;

determining cross-cluster transmission parameters, based on the RDMA connection count set as the target connection count and the Buffer size set as the target size; and communicating, according to the cross-cluster transmission parameters, with the communication receiver belonging to a different computing power cluster.

* * * * *